United States Patent
Greenebaum (10) Patent No.: US 8,225,061 B2
(45) Date of Patent: Jul. 17, 2012

(54) METHOD AND APPARATUS FOR PROTECTED CONTENT DATA PROCESSING

(75) Inventor: Kenneth Greenebaum, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 468 days.

(21) Appl. No.: 12/497,522

(22) Filed: Jul. 2, 2009

(65) Prior Publication Data

US 2011/0004737 A1    Jan. 6, 2011

(51) Int. Cl.
*G06F 12/14* (2006.01)

(52) U.S. Cl. .......... 711/163; 711/165; 711/170; 726/26; 726/27

(58) Field of Classification Search .......... 711/167, 711/170; 726/26, 27
See application file for complete search history.

(56) References Cited

U.S. PATENT DOCUMENTS

| | | | |
|---|---|---|---|
| 6,199,181 B1 | 3/2001 | Rechef et al. | |
| 7,469,421 B2 | 12/2008 | Telesco | |
| 7,941,860 B2* | 5/2011 | Poisner | 726/27 |
| 7,996,913 B2* | 8/2011 | Kocher et al. | 726/27 |
| 2002/0138701 A1* | 9/2002 | Suzuoki et al. | 711/154 |
| 2005/0114687 A1* | 5/2005 | Zimmer et al. | 713/193 |
| 2005/0235362 A1* | 10/2005 | England et al. | 726/27 |
| 2005/0273853 A1 | 12/2005 | Oba et al. | |
| 2006/0047959 A1 | 3/2006 | Morais | |
| 2006/0149968 A1* | 7/2006 | Edery et al. | 713/181 |
| 2007/0199057 A1 | 8/2007 | Plummer | |
| 2007/0266438 A1* | 11/2007 | Rodgers et al. | 726/26 |
| 2008/0101604 A1* | 5/2008 | Kocher et al. | 380/210 |
| 2008/0127292 A1 | 5/2008 | Cooper et al. | |
| 2008/0189796 A1 | 8/2008 | Linn et al. | |
| 2008/0250499 A1 | 10/2008 | Moat et al. | |
| 2009/0193503 A1* | 7/2009 | Shevehenko et al. | 726/4 |
| 2009/0316889 A1* | 12/2009 | MacDonald et al. | 380/201 |
| 2010/0082926 A1* | 4/2010 | Sahita et al. | 711/163 |
| 2010/0106926 A1* | 4/2010 | Kandasamy et al. | 711/163 |
| 2010/0192224 A1* | 7/2010 | Ferri et al. | 726/23 |
| 2010/0293392 A1* | 11/2010 | Miyamoto | 713/193 |

(Continued)

FOREIGN PATENT DOCUMENTS

WO    WO/02/42879 A2    5/2002
WO    WO 03/017682 A2   2/2003

OTHER PUBLICATIONS

International Search Report and Written Opinion mailed Oct. 7, 2010, for International Application No. PCT/US2010/039266, 15 pages.

(Continued)

*Primary Examiner* — John Lane (74) *Attorney, Agent, or Firm* — Blakely, Sokoloff, Taylor & Zafman LLP (57) ABSTRACT

Methods and an apparatuses that perform protected content data processing with limited access to system resources are described. One or more regions in a memory (including a source memory and a destination memory) can be allocated and unprocessed content data can be mapped to the source memory. A process can be initialized with the source and destination memories to process the content data. The process can be prevented from accessing resource other than the allocated regions in the memory. The processed content data can be stored in the destination memory. In one embodiment, the content data can include media content. A playing device can be instructed to play the media content based on the processed content data via the destination memory.

21 Claims, 6 Drawing Sheets

U.S. PATENT DOCUMENTS

2010/0293614 A1* 11/2010 Vilppola et al. ............... 726/22
2011/0047613 A1* 2/2011 Walsh ........................... 726/16
2011/0067105 A1* 3/2011 Wolfe et al. ................... 726/23
2011/0154431 A1* 6/2011 Walsh ............................ 726/1
2011/0179483 A1* 7/2011 Paterson et al. ............... 726/22
2011/0208907 A1* 8/2011 Raikin et al. ................. 711/105
2011/0283363 A1* 11/2011 Verschoor et al. ............ 726/26

OTHER PUBLICATIONS

International Preliminary Report on Patentability mailed Jan. 12, 2012, for International Application No. PCT/US2010/039266, 9 pages.

International Preliminary Report on Patentability mailed Jan. 12, 2012 for PCT/US2010/039266 filed Jun. 18, 2010.

* cited by examiner

Maintaining one or more decoder processes to decode data, each decoder process being limited to access system resources within a pair of source memory and a destination memory associated with the decoder process 401

In response to receiving a message from an application process for playing back an encoded content data, identifying an decoder process which is available 403

Mapping the encoded content data into the source memory associated with the identified decoder process 405

Instructing the identified decoder process to decode the encoded content data from the source memory to the destination memory 407

METHOD AND APPARATUS FOR PROTECTED CONTENT DATA PROCESSING

FIELD OF INVENTION

The present invention relates generally to secure computing. More particularly, this invention relates to protecting a computing system to process content data.

BACKGROUND

Content data processing, such as video decoding, usually requires sophisticated processing cycles on uncontrolled raw content. With the proliferation of security attacks, more and more malicious data (or codes) are embedded inside raw content from third party sources, such as openly available internet web sites. However, in order to achieve high computation efficiency, most content data processing operations cannot practically perform enough security checks in each processing step. As a result, more and more security risks are introduced via content data processing systems with ever increasing number of available sources for unregulated or untrusted content data.

For example, source content data may include maliciously codes and/or incorrectly encoded codes. Typically, malicious codes are intentionally injected to cause damages to a system. When executed, malicious codes may attack the system to cause a variety of security damages, such as denying certain services from the system, illegally erasing privileged data, sending out span email messages, or retrieving secret user information (e.g. account numbers, passwords . . . ) etc. On the other hand, incorrectly encoded codes may be introduced by programming errors, transmission failures, or simply lack of robustness in a real operating environment. Decoding incorrectly encoded content data, such as having a value out of proper range, may result in system or application failures, thus making a system and/or an application less reliable and even not practically useful.

Furthermore, an application performing content data processing, such as video playback, typically calls well known APIs (application processing interfaces) to libraries (e.g. multimedia and/or graphics processing libraries) linked with the application. Thus, content data processing is usually performed in the same process running the application calling the APIs. Consequently, malicious attacks originating from content data can directly affect a calling application. For example, an application can crash by a failure which occurs when calling APIs for content data processing. Even worse, such malicious attacks are often capable of leveraging access privileges assigned to an application to inflict serious security damage to a system.

Therefore, traditional systems do not provide content data processing services which protect the systems as well as applications requesting such services.

SUMMARY OF THE DESCRIPTION

An embodiment can include methods and apparatuses that perform protected content data processing with limited access to system resources. One or more regions in memory, including a source memory and a destination memory, can be allocated for a decoder process to decode compressed data. The compressed data can be mapped to the source memory. The decoder process can be prevented from access resources other than the allocated regions in the memory for protected decoding operations. The compressed data can be decoded by the decoder process from the source memory to the destination memory as decoded data. A playing device can play media content based on the decoded data via the destination memory.

In an alternative embodiment, a process can be initialized with one or more regions allocated in memory for the process to perform processing operations on content data. A notification can be sent from the process to relinquish resource access rights other than a fixed set of resources including the allocated regions. The processing operations can be performed on the content data with resource access rights restricted to the fixed set of resources. An application process can be notified when the content data is successfully. A media playing device can be instructed by the application process to play based on a representation of the content data from the allocated regions.

In another embodiment, one or more decoder processes can be maintained in a memory. Each decoder process may be a separate instance of a common decoder code. One of the decoder processes can be identified in response to receiving an encoded data from an application process. The identified decoder process can have resource access capability limited to a source memory and a destination memory. An instruction can be sent to the identified decoder process to decode the encoded data from the source region into the destination region. A notification can be sent to the application process when the encoded data is successfully decoded to cause a media playing device to play media content based on the decoded data via the destination memory.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Methods and apparatuses for protected content data processing are described herein. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

In one embodiment, content data processing (e.g. video coding, decoding, playing back) can be provided to applications via a generic security mechanism. An application running in an application process can make API calls (e.g. library interfaces for traditional audio/video, graphics or other multimedia processing) to cause a separate process to perform content data processing insulated from the application. In one embodiment, an application can continue to run even when a failure occurs while processing the requested content data (for example, a process crashes while decoding video data). Separating the application and the content data processing in different processes can allow the application to proceed without being brought down or compromised by the failure in content data processing.

In one embodiment, limitations to access system resources can be imposed during content data processing to sandbox a system and/or an application from potential damage caused, for example, by malicious or inconsistent (e.g. incorrectly encoded) content data. System resources can include, for example, files, disks, networks, clocks, memories, and/or registers etc. A set of APIs can be provided for a process to explicitly restrict access rights to, for example, an input (or source) buffer and an output (or destination) buffer while relinquishing access rights to other resources. Protection mechanisms can be triggered by an attempt to access system or user resources that have been relinquished (e.g. other than an input buffer and/or an output buffer). Security attacks, such as buffer overflow attacks, can be trapped and avoided. Thus, an application can continue on in the presence of attacks or other errors. Even if a decoder process is hijacked (e.g. due do a malicious attack), very little damage would result from the hijacked process as it has relinquished access to most system resources (such as networks, input/output devices, privileged memory areas, files, etc.) except for very limited ones, such as source memory, destination memory and working memory.

In some embodiments, memory buffers are efficiently passed around among different processes (e.g. running in the same or separate processors) with various privileges via memory pointers. For example, pointers to memory buffers can be passed between an application process and a background process that is processing content data processing (e.g. a video decoder process). The application process and the background process can be prohibited from accessing each other's memory space directly. An application can call APIs to initiate the decoder process.

Figure 1:
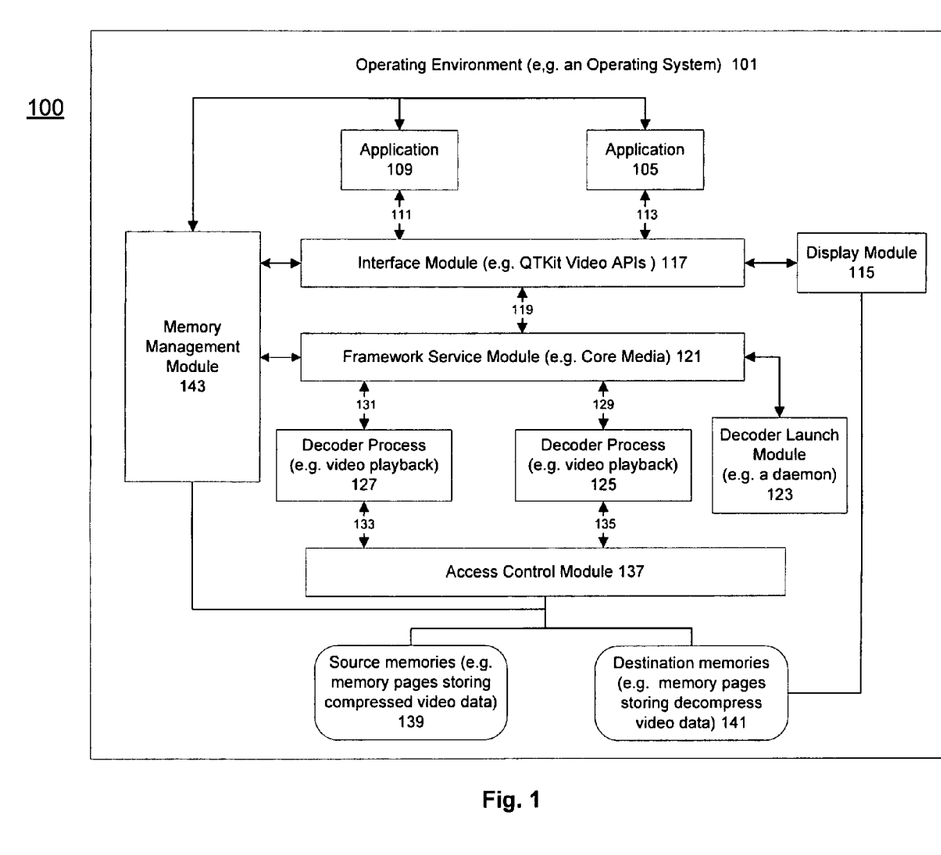
FIG. 1 is a block diagram illustrating an exemplary embodiment of a system for protected content data processing.

FIG. 1 is a block diagram illustrating an exemplary embodiment of a system for protected content data processing. In one embodiment, system 100 can include an operating environment (e.g. a computer operating system) 101 that supports one or more applications (or application processes) 105,109. Applications 105, 109 can invoke protected content data processing, such as video decoding tasks, in separate processes 125, 127. In one embodiment, application processes 105, 109 can run applications linked with an interface module 117 to process input data (such as compressed video content) associated with each application process. An interface module 117 can provide API support associated with content data processing for an application. For example, the interface module 117 can include APIs (e.g. QuickTime® or QTKit APIs) for processing (e.g. playing back, encoding, decoding, editing, etc.) multimedia content (e.g. audio/video and/or graphics, etc.). Applications 105, 109 can make API calls through interface module 117.

In one embodiment, a framework service module 121, such as Core Media in an operating system from Apple Inc., can run in a service process separate from application processes 105, 109. Framework service module 121 can implement APIs supported in the interface module 117. A service process can be resident (or executed and maintained) with an operating system 101 (e.g. started when the operating system starts running). The framework service module 121 can communicate with the interface module 117 via system messages (e.g. Mach® messages), such as inter process messages 119. Interface module 117 can include libraries linked within applications 105, 109 as part of application processes. In one embodiment, the framework service module 121 can send a request to start one or more decoder processes 125, 127 to perform protected content data processing via a decode launch module 123. Decode launch module 123 can run as a daemon process in the operation system 101. Each decoder process 125, 127 may be based on the same executable code. A decode process 125, 127 can run independently of the other decoder processes and application processes 105, 109. Decoder processes 125,127 can communicate with applications 105, 109 via inter process messages 1129, 131 to perform protected processing on content data 103, 107 for the applications 105,109.

In one embodiment, an application 105, 109 and/or an operating environment 101 (including user/system data) can be protected by limiting memory access from a decoder process 125, 127 when performing content data processing. A source memory, a destination memory or a working memory may be a memory area or a memory region allocated from a portion of one or more physical memory devices associated with the operating environment. In one embodiment, framework service module 121 can allocate source memories 139 and/or destination memories 141 via memory management module 143 when invoking (or starting) decoder process 125, 127. In some embodiments, decoder launch module 123 can request a memory management module 143 to allocate source memories 139 and/or destination memories 141 for launching decoder processes 125, 127. Source memories 139 or destination memories 141 can include one or more memory pages. A source memory and/or a destination memory may be allocated exclusively for a single decoder process among other concurrently running decoder processes. Memory management module 143 can enable data stored in memory areas in different process spaces to be passed among the process spaces using data pointers. Thus, input data for application processes 105, 109 may be mapped into source memories 139 via data pointers without the need for copying data.

According to one embodiment, decoder processes 125, 127 can relinquish rights to access system resources except for source memories and destination memories allocated for the decoder processes. Access control module 137 can be configured to intercept system resource access requests 133, 135 from decoder processes 125, 127 to guard against (or deny) access to system resources relinquished by the decode processes. The decode process also can restrict themselves from accessing system resources other than source and destination memories prior to and/or when performing decoding or content data processing tasks. Thus, any harm intended by a malicious code embedded as input content data can be confined within the limited resources associated with the decoder processes (e.g. the allocated source and/or destination memories)).

Figure 2:
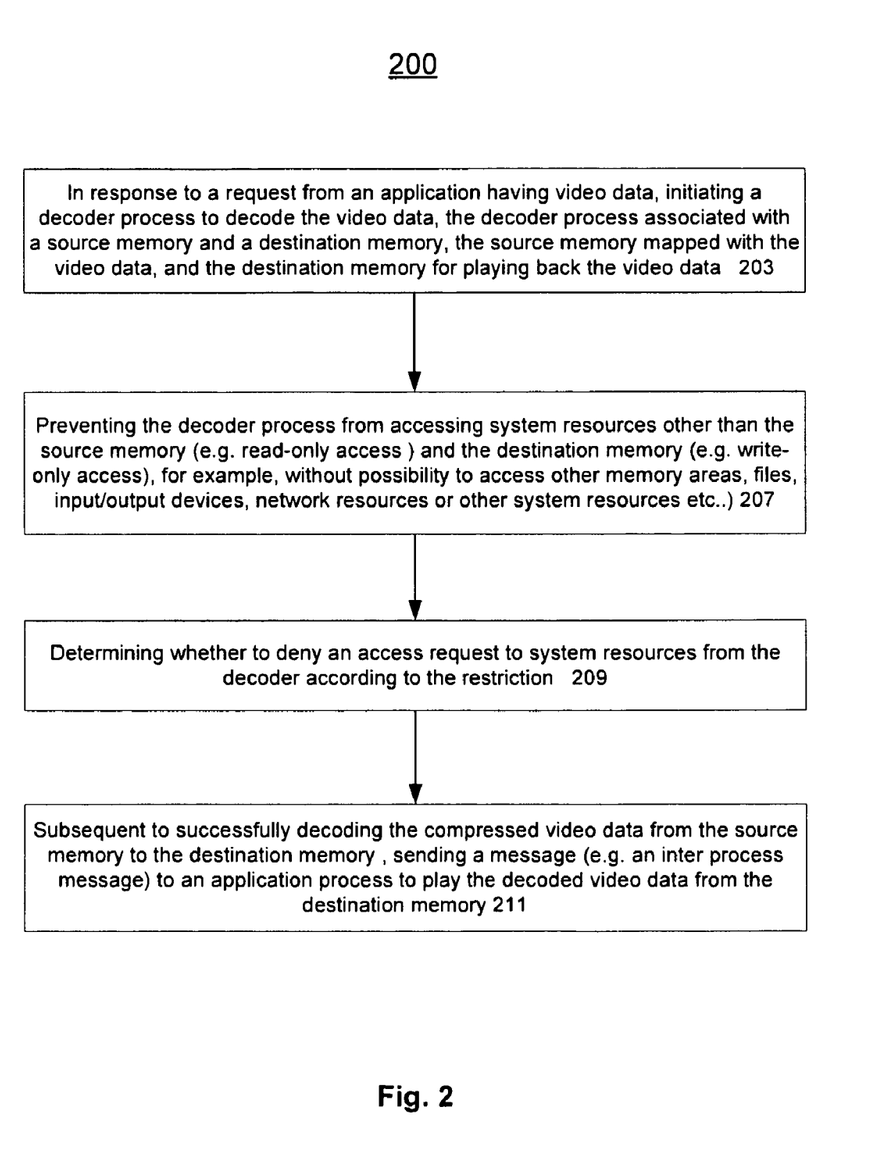
FIG. 2 is a flow diagram illustrating an exemplary process to perform protected content data processing for an application process.

FIG. 2 is a flow diagram illustrating an exemplary process to perform protected content data processing for an application process. Exemplary process 200 may be performed by a processing logic that may comprise hardware (circuitry, dedicated logic, etc.), software (such as is run on a dedicated machine), or a combination of both. For example, process 200 may be performed by some components of system 100 of FIG. 1. The processing logic of process 200 can load code for a decoder process into memory. When executed, the code may decode compressed data (e.g. in a decoder process 125, 127 of FIG. 1). In some embodiments, the processing logic of process 200 can load decoder code into memory for a decoder process when a system starts up. Alternatively, the processing logic of process 200 can load the decoder code into memory during run time in response to a decoding request from an application. The decoder code can be retrieved from storage (internal and/or external), and/or over a network connection.

At block 203, in one embodiment, the processing logic of process 200 can initiate a decoder process to decode content data in response to receiving a request from an application (e.g. from an application process, such as application 105, 109 of FIG. 1) having content data (such as a compressed video data or other media data). The processing logic of process 200 may allocate a source memory and a destination memory for the decoder process. The source and destination memories may correspond to portions of one or more physical memory devices in a system, such as system 100 of FIG. 1. The processing logic of process 200 may receive an inter process message including a data pointer to the content data. The source memory and the destination memory can serve as an input buffer and an output buffer respectively for decoding compressed video content (e.g. for playing back). The content data from the application may be mapped to the source memory without a need to physically copying the content data.

In one embodiment, the processing logic of process 200 can send an inter process message to a launch daemon (process), such as decoder launch module 123 of FIG. 1, to invoke the decoder process. The decode process can be launched independent of other processes (e.g. applications 105,109 of FIG. 1). A launch daemon may be a stand alone process responsible for managing decoder processes. In some embodiments, a launch daemon can invoke multiple independent instances of the decoder process executed in one or more processors. The processing logic of process 200 can provide allocated source and destination memories to the launch daemon to invoke decoder processes. More details for an alternative embodiment to initiate decoder processes are described in FIG. 4.

In one embodiment, at block 207, the processing logic of process 200 can prevent (or restrict) a decoder process from accessing system resources other than a source memory and a destination memory. The decoder process may not be permitted to access other system resources. Additionally, further limitations can be imposed on access of the source and destination memories by the decoder process. In some embodiments, access of the source memory from the decoder process is limited to read-only access, and access of the destination memory from the decoder process can be limited to write-only access. The decoder process can voluntarily give up (or relinquish) access rights to other system resources (for example, through making associated system calls) prior to and/or during decoding operations or other content data processing tasks. The decoder process can relinquish access rights by making a relinquish request via a system call. The relinquish request may explicitly identify system resources for which access rights are relinquished. In one embodiment, the processing logic of process 200 can limit access of system resources by the decoder process (e.g. access control module 137 of FIG. 1). The processing logic of process 200 can intercept a request for accessing a system resource by the decoder process and determine whether to grant or deny the request based on the access rights Thus, the processing logic of process 200 may prevent the decoder process from violating access restrictions. The processing logic of process 200 can deny a request, for example, by returning an error message to the decoder process. As a result, the decoder process may not be allowed to access system resources other than data stored in the source and destination memories. Non-accessible system resources can include, for example files, input/output devices, registers, clocks, network connections, etc. More details for an embodiment to prevent a decoder process from accessing system resources are described in FIG. 3.

Subsequently, at block 209, in one embodiment, the processing logic of process 200 can determine whether to grant a request to access system resources from the decoder process based on the access restriction associated with the decoder process. For example, the processing logic of process 200 can deny an illegal system access attempt caused by malicious data inside input video data to the decoder process. An illegal system access attempt from a decoder process can be an access request which violates access restrictions imposed on the decoder process. In some cases, the processing logic of process 200 can detect that a decoder process crashes before completing decoding operations. The processing logic of process 200 can initiate a new decoder process (based on the same code associated with the failed decoder process) if the decoder process fails. The processing logic of process 200 can alternatively send a message (e.g. an inter process message) to an application process to indicate a failure or an error in decoding the compressed video data. Otherwise, if decoding operations are successfully completed (e.g. conforming to access restrictions imposed on a decoder process), at block 211, the processing logic of process 200 can send a message to the application process for displaying or playing back video data available from a destination memory. The processing logic of process 200 can receive a message from the decoder process indicating decoding operations have been successfully completed.

Figure 3:
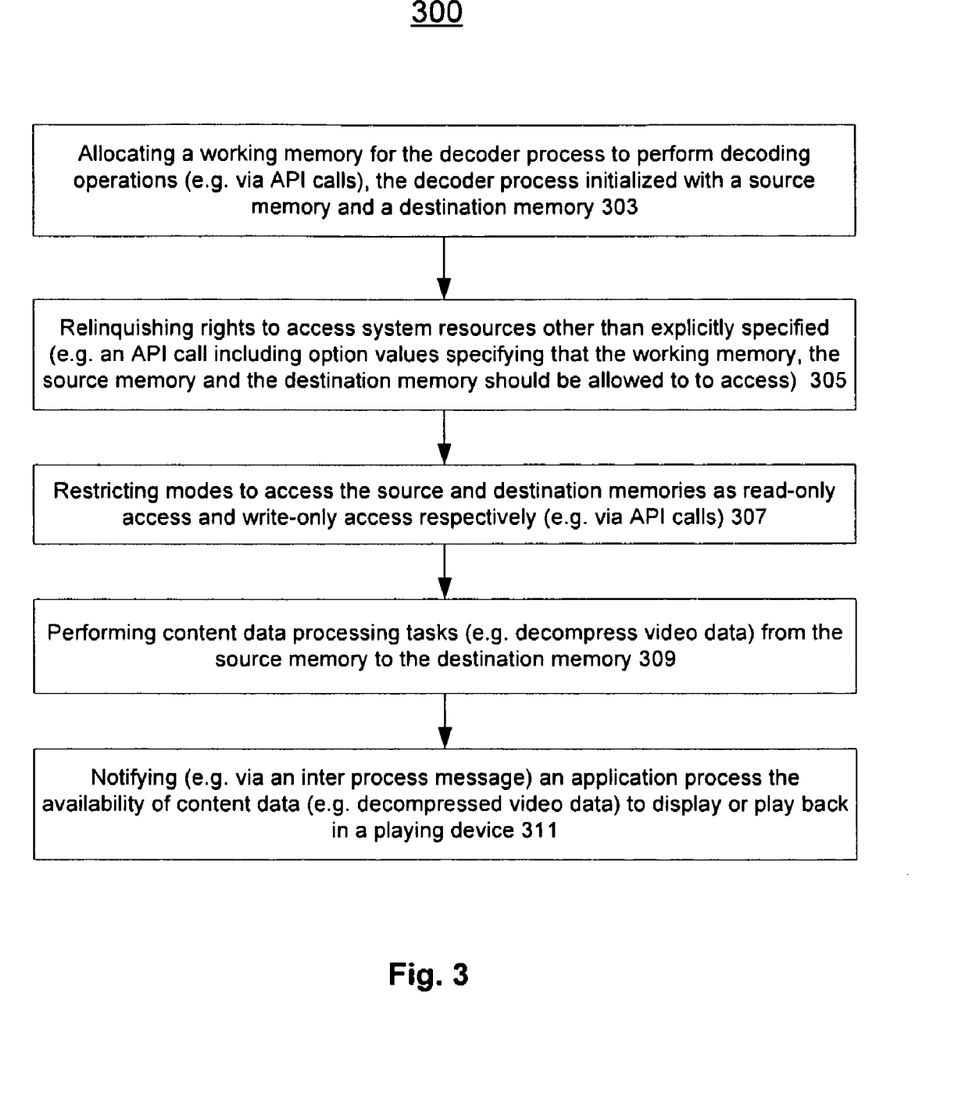
FIG. 3 is a flow diagram illustrating an exemplary process to relinquish resource accesses for protected content data processing.

FIG. 3 is a flow diagram illustrating an exemplary process to relinquish access to resources for protected content data processing. Exemplary process 300 may be performed by a processing logic that may comprise hardware (circuitry, dedicated logic, etc.), software (such as is run on a dedicated machine), or a combination of both. For example, process 300 may be performed by some components of system 100 of FIG. 1. In one embodiment, the processing logic of process 300 can initialize a process (such as a decoder process 125, 127 of FIG. 1) with a source memory and a destination memory (such as memories 139 and 141 of FIG. 1) At block 303, the processing logic of process 300 may allocate a working memory to perform decoding operations or other content data processing tasks. The working memory of a process may be the number of memory pages physically allocated in memory for the memory address space of the process. A memory region, a source memory, a destination memory, or a working memory do not require contiguous memory blocks. Rather, each refers to collected memory blocks allocated for each purpose. In one embodiment, the processing logic of process 300 can call APIs for a system module, such as memory management module 143 of FIG. 1, to allocate the working memory.

At block 305, the processing logic of process 300 can cause the decoder process to relinquish rights to access system resources other than explicitly specified in an API call. For example, the API call can include option values specifying which resources (for example, a working memory, a source memory and a destination memory) a decoder process is allowed to access. The processing logic of process 300 can protect system resources from being corrupted when processing external content data, such as compressed video content infected with viruses. In one embodiment, the processing logic of process 300 can call APIs to request or notify the system not to allow access to system resources from the present process except for the working memory, the source memory and the destination memory. Additionally, at block 307, the processing logic of process 300 can further restrict modes of accessing permitted system resources through the use of API calls. For example, access to source memories may be read-only access and access to destination memories may be write-only access. The processing logic of process 300 may send a message to the calling application indicating a failure if an error occurs when a decoder process making an API call for relinquishing or restricting access rights.

In one embodiment, at block 309, the processing logic of process 300 can proceed to perform content processing tasks (such as decoding or decompressing video data from a source memory into a destination memory) subsequent to relinquishing access rights. In one embodiment, the processing logic of process 300 can send a message to an application indicating a failure if resource access denial is detected when performing content processing operations (e.g. caused by a malicious content data). At block 311, if the content processing tasks are successfully completed, the processing logic of process 300 can notify the application process of the availability of processed content data (e.g. decompressed video data) in the destination memory for the application to display or play back on a display device. This can be accomplished, for example, by inter process messages via a service process, such as framework service module 121 of FIG. 1.

Figure 4:
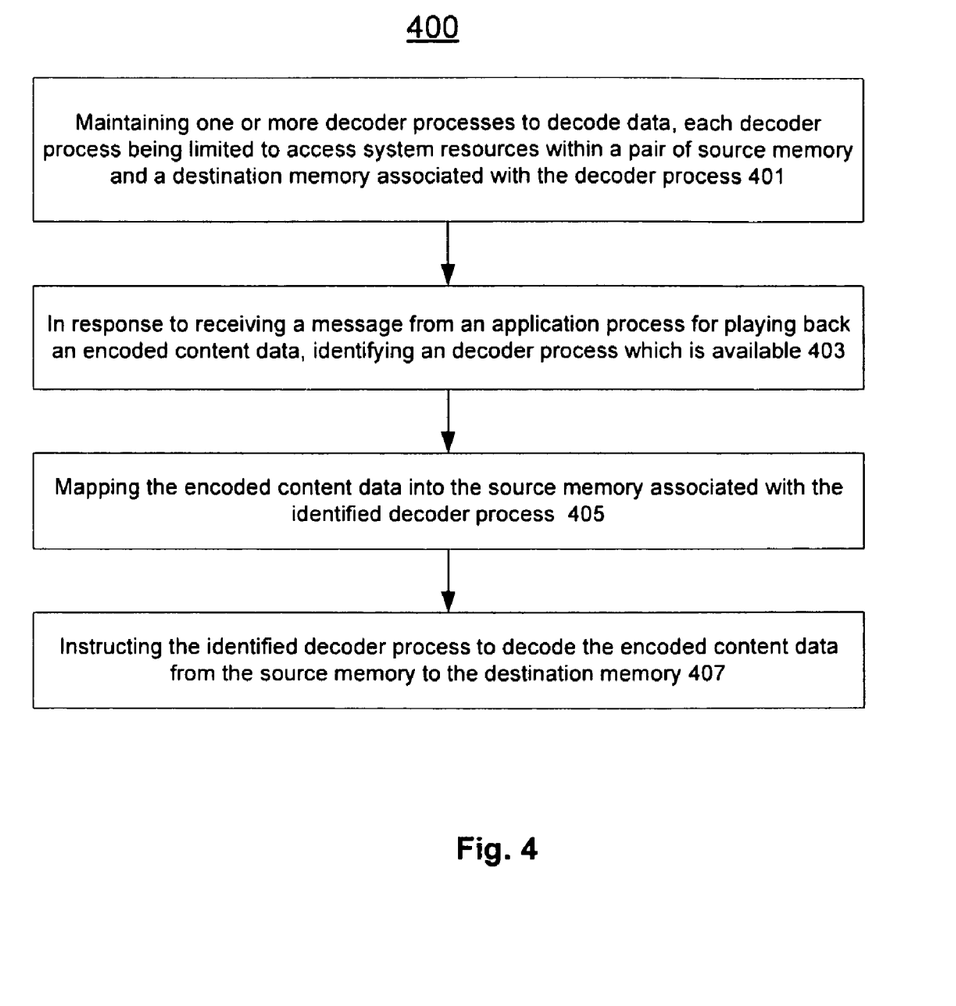
FIG. 4 is a flow diagram illustrating an exemplary process to provide protected content data processing.

FIG. 4 is a flow diagram illustrating an exemplary process to provide protected content data processing. Exemplary process 400 may be performed by a processing logic that may comprise hardware (circuitry, dedicated logic, etc.), software (such as is run on a dedicated machine), or a combination of both. For example, process 400 may be performed by some components of system 100 of FIG. 1. In one embodiment, at block 401, the processing logic of process 400 can maintain one or more decoder processes concurrently, such as decoder processes 125, 127 of FIG. 1, for performing decoding tasks (or other processing tasks) for content data. Each decoder process can be based on a common code (e.g. an instance of the same executable code image) for performing decoding or other task. In one embodiment, a separate (or unique) pair of source memory and destination memory is allocated for each decoder process. An access restriction to system resources within its associated pair of source and destination memories can be imposed for each decoder process. Access to system resources outside the associated memories by a decoder process can cause a failure (e.g. sending a failure message and/or aborting a processing task).

At block 403, in one embodiment, the processing logic of process 400 can identify a decoder process which is available (e.g. idling waiting for requests) to perform decoding tasks in response to a message (e.g. an inter process message) received from an application process for playing back or displaying an encoded content data (e.g. compressed video content). The processing logic of process 400 can initiate a new decoder process if there is no decoder process available (e.g. each is busy performing decoding tasks). In some embodiments, the processing logic of process 400 waits until at least one decoder process is available. At block 405, the processing logic of process 400 can map the encoded content data associated with the application process to a source memory allocated for the identified decoder process.

The processing logic of process 400 can instruct (e.g. send an inter process message) an identified decoder process at block 407 to decode encoded content data from a source memory to a destination memory associated with the decoder process. If the content data is successfully decoded, at block 409, the processing logic of process 400 can notify (e.g. send an inter process message) an application process of the availability of the decoded content data in the destination memory. A media playing device (such as a display device) can play (e.g. display) the decoded content (or a representation of the decoded content) from the destination memory. In the event a failure occurs while the decoder process is decoding the content data (e.g. a crash of the decoder process is detected or an error message is received), the processing logic of process 400 can relay a message indicating the failure to the application process or identify another decoder process for another attempt to decode the content data.

In the event a decoder process crashes, in one embodiment, the processing logic of process 400 may restart a new decoder process transparently (i.e. not noticed by) to a calling application (calling for a decoding service) and/or an end user. As a result, not only are security issues mitigated, but crashes that might cause a user to lose all of his/her work are protected against. In some embodiments, even the playback which is being performed based on the currently decoded content may be continued with minimal interruption. A decode buffer may be provided to support playback latency/resilience to mask the time needed to restart the decoder process before the already decoded frames (or content) were exhausted during the playback.

Figure 5:
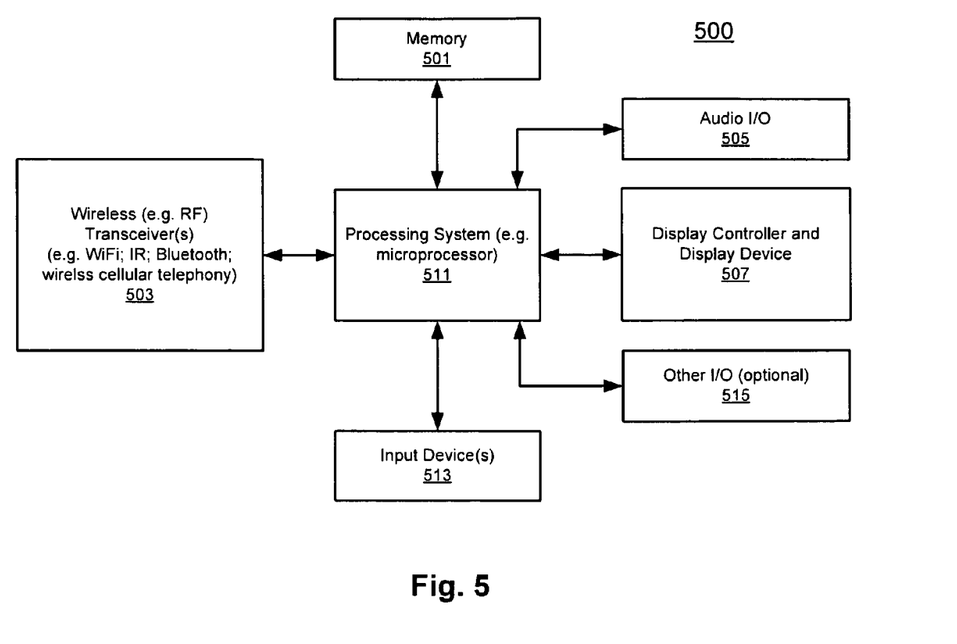
FIG. 5 illustrates one example of a computer system which may be used in conjunction with the embodiments described herein.

FIG. 5 shows an example of a data processing system which may be used with one embodiment of the present invention. For example, system 500 may be implemented as part of systems as shown in FIG. 1. The data processing system 500 shown in FIG. 5 includes a processing system 511, which may be one or more microprocessors, or which may be a system on a chip of integrated circuit, and the system also includes memory 501 for storing data and programs for execution by the processing system. The system 500 also includes an audio input/output subsystem 505 which may include a microphone and a speaker for, for example, playing back music or providing telephone functionality through the speaker and microphone.

A display controller and display device 507 provide a visual user interface for the user; this digital interface may include a graphical user interface which is similar to that shown on an iPhone® phone device or on a Macintosh computer when running operating system software. The system 500 also includes one or more wireless transceivers 503 to communicate with another data processing system. A wireless transceiver may be a WiFi transceiver, an infrared transceiver, a Bluetooth transceiver, and/or a wireless cellular telephony transceiver. It will be appreciated that additional components, not shown, may also be part of the system 500 in certain embodiments, and in certain embodiments fewer components than shown in FIG. 5 may also be used in a data processing system.

The data processing system 500 also includes one or more input devices 513 which are provided to allow a user to provide input to the system. These input devices may be a keypad, a keyboard, a touch panel, or a multi touch panel. The data processing system 500 also includes an optional input/output device 515 which may be a connector for a dock. It will be appreciated that one or more buses, not shown, may be used to interconnect the various components as is well known in the art. The data processing system shown in FIG. 5 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device. In other embodiments, the data processing system 500 may be a network computer or an embedded processing device within another device, or other types of data processing systems which have fewer components or perhaps more components than that shown in FIG. 5.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod®, or iPod Nano® media player from Apple Inc. of Cupertino, Calif., a touch screen or multi-touch input device, pushbutton device, movable pointing input device or other input device. The media selection device may be used to select the media stored on the storage device and/or a remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s).

Figure 6:
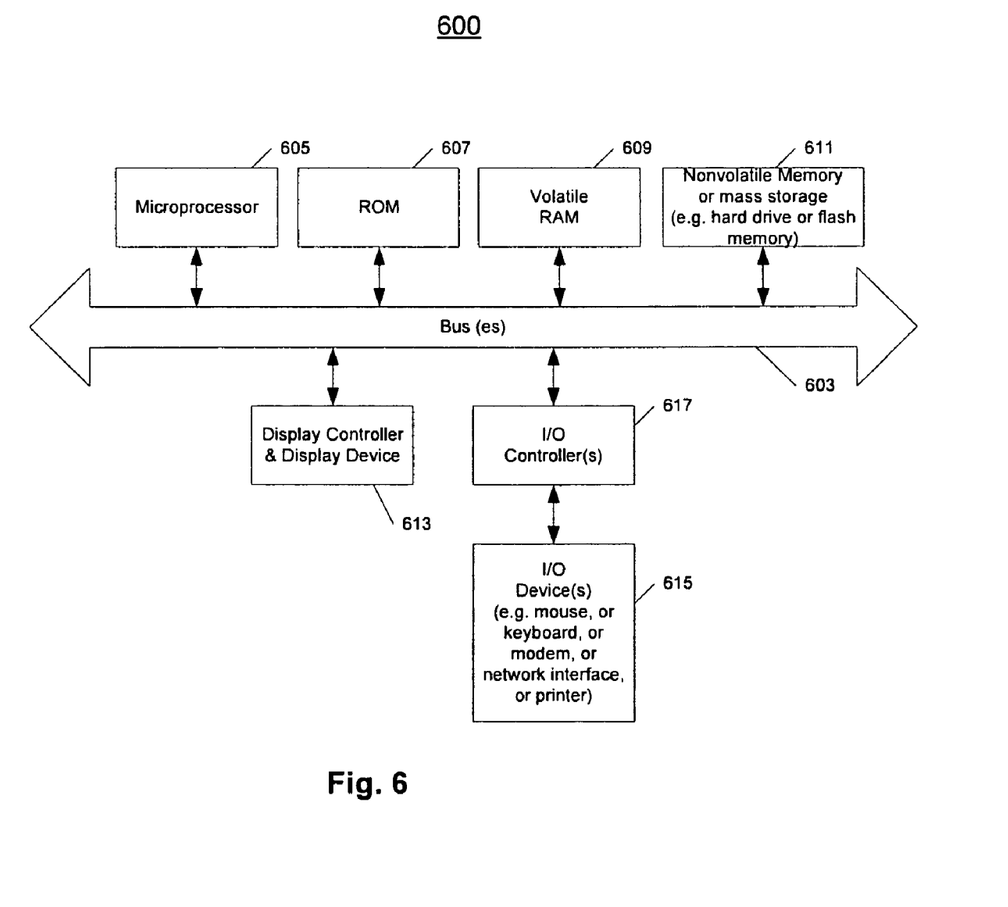
FIG. 6 illustrates one example of a data processing system which may be used in one embodiment.

FIG. 6 shows one example of a data processing system such as a computer system, which may be used with one embodiment. For example, the system 600 may be implemented as a part of the system shown in FIG. 1. Note that while FIG. 6 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 6, the computer system 601, which is a form of a data processing system, includes a bus 603 which is coupled to a microprocessor(s) 605 and a ROM (Read Only Memory) 607 and volatile RAM 609 and a non-volatile memory 611. The microprocessor 605 may retrieve the instructions from the memories 607, 609, 611 and execute the instructions to perform operations described above. The bus 603 interconnects these various components together and also interconnects these components 605, 607, 609, and 611 to a display controller and display device 613 and to peripheral devices such as input/output (I/O) devices which may be mice, keyboards, modems, network interfaces, printers and other devices which are well known in the art. The input/output devices 615 are coupled to the system through input/output controllers 617. The volatile RAM (Random Access Memory) 609 can be implemented as dynamic RAM (DRAM) which requires power continually in order to refresh or maintain the data in the memory.

The mass storage 611 can be a magnetic hard drive or a magnetic optical drive or an optical drive or a DVD RAM or a flash memory or other types of memory systems which maintain data (e.g. large amounts of data) even after power is removed from the system. The mass storage 611 will also be a random access memory although this is not required. While FIG. 6 shows that the mass storage 611 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface or wireless networking interface. The bus 603 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A computer implemented method, comprising:
   allocating a source memory and a destination memory for a decoder process to perform decoding operations using the source memory;
   in response to an API (Application Programming Interface) request to decode compressed content data from an application process separate from the decoder process, initializing the decoder process to perform the decoding operations on the compressed content data;
   in response to a relinquishing request from the decoder process to restrict access rights of the decoder process for resources other than the source and destination memories, configuring an access control with the restricted access rights of the decoder process; and
   preventing the decoder process from accessing resources other than the source and destination memories during decoding the compressed content data via the configured access control, wherein the destination memory is used to store the decoded content data and wherein a playing device is to play media content based on the decoded content data.

2. The method of claim 1, further comprising mapping the compressed content data into the source memory.

3. The method of claim 1, wherein the compressed content data includes compressed video content associated with the application process.

4. The method of claim 3, wherein the decoder process and the application process are run by independent executable codes.

5. The method of claim 3, wherein preventing the decoder process comprises:
   determining a limitation to access system resources for the decoder process; and
   denying a resource access request from the decoder process if the resource access request violates the limitation.

6. The method of claim 5, wherein the determination of the limitation is based on the relinquishing request from the decoder process, and wherein the relinquishing request indicates one or more system resources that the decoder process is allowed to access.

7. The method of claim 5, wherein the limitation indicates the decoder process is allowed to access the source area and the destination area.

8. The method of claim 7, wherein the limitation indicates the decoder process is restricted to access the source area in a read-only mode.

9. The method of claim 7, wherein the limitation indicates the decoder process is restricted to access the destination area in a write-only mode.

10. The method of claim 5, wherein the denying comprises:
    generating a failure message for the application process, the failure message indicating that the compressed content data cannot be decoded.

11. The method of claim 1, further comprising:
    initiating the decoder process with the source and destination memories; and
    detecting whether the decoder process crashes while decoding the compressed data.

12. The method of claim 11, further comprising:
    initiating a separate decoder process to decode the compressed content data if the decoder process crashes.

13. A computer implemented method, comprising:
    in response to an API (Application Programming Interface) request from an application process having content data, initializing a process with one or more regions allocated in memory, the process to perform processing operations on the content data, and the process separate from the application process;
    sending a request from the process during runtime of the process to relinquish access rights to resources other than a plurality of accessible resources, wherein the plurality of accessible resources include the content data and the one or more regions allocated in memory; and
    performing the processing operations on the content data, wherein the processing operations are restricted from accessing resources other than the plurality of accessible resources, wherein the one or more allocated regions are used to store the processed content data and wherein a playing device is to play media content based on the processed content data.

14. The method of claim 13, wherein the one or more regions include a source memory and a destination memory, and wherein the content data is processed from the source memory to the destination memory.

15. The method of claim 13, wherein the sending the request comprises calling an API (application programming interface).

16. The method of claim 13, wherein one of the access rights relinquished includes a right to access a network connection.

17. A computer implemented method, comprising:
maintaining one or more decoder processes loaded in memory, each decoder process to decode data;
in response to receiving encoded data from an application process via an API (Application Programming Interface) request, identifying one of the decoder processes which is available;
receiving a request from the identified decoder process to restrict the identified decoder process from accessing resources other than a source memory and a destination memory allocated for the identified decoder process; and
instructing the identified decoder process to decode the encoded data from the source memory and store the decoded data in the destination memory, wherein a playing device is to play media content based on the decoded data.

18. A machine-readable non-transitory storage medium having instructions, when executed by a machine, cause the machine to perform a method, the method comprising:
allocating a source memory and a destination memory for a decoder process to perform decoding operations using the source memory;
in response to an API (Application Programming Interface) request to decode compressed content data from an application process separate from the decoder process, initializing the decoder process to perform the decoding operations on the compressed content data;
in response to a relinquishing request from the decoder process to restrict access rights of the decoder process for resources other than the source and destination memories, configuring an access control with the restricted access rights of the decoder process; and
preventing the decoder process from accessing resource other than the source and destination memories during decoding the compressed content data via the configured access control, wherein the destination memory is used to store the decoded content data and wherein a playing device is to play media content based on the decoded content data.

19. A machine-readable non-transitory storage medium having instructions, when executed by a machine, cause the machine to perform a method, the method comprising:
in response to an API (Application Programming Interface) request from an application process having content data, initializing a process with one or more regions allocated in memory, the process to perform processing operations on the content data, and the process separate from the application process;
sending a request from the process during runtime of the process to relinquish access rights to resources other than a plurality of accessible resources, wherein the plurality of accessible resources include the content data and the one or more regions allocated in memory; and
performing the processing operations on the content data, wherein the processing operations are restricted to access from accessing resources other than the plurality of accessible resources, wherein the one or more allocated regions are used to store the processed content data and wherein a playing device is to play media content based on the processed content data.

20. A machine-readable non-transitory storage medium having instructions, when executed by a machine, cause the machine to perform a method, the method comprising:
maintaining one or more decoder processes loaded in memory, each decoder process to decode data;
in response to receiving encoded data from an application process via an API (Application Programming Interface) request, identifying one of the decoder processes which is available;
receiving a request from the identified decoder process to restrict the identified decoder process from accessing resources other than a source memory and a destination memory allocated for the identifier decoder process; and
instructing the identified decoder process to decode the encoded data from the source memory and store the decoded data in the destination memory, wherein a playing device is to play media content based on the decode data.

21. An apparatus, comprising:
a memory storing executable instructions including an image of decode codes;
a display device coupled to the memory; and
a processor coupled to memory and the display device, the processor being configured to execute the executable instructions from the memory to:
allocate a source memory and a destination memory for a decoder process to perform decoding operations using the source memory,
initialize, in response to an API (Application Programming Interface) request to decode compressed content data from an application process separate from the decoder process, the decoder process to perform the decoding operations on the compressed content data,
configure, in response to a relinquishing request from the decoder process to restrict access rights of the decoder process other than the source and destination memories, an access control with the restricted access rights of the decoder process, and
prevent the decoder process from accessing resources other than the source and destination memories during decoding the compressed content data via the configured access control, wherein the destination memory is used to store the decoded content data and wherein a playing device is to play media content based on the decoded content data.

* * * * *

UNITED STATES PATENT AND TRADEMARK OFFICE
CERTIFICATE OF CORRECTION

PATENT NO.         : 8,225,061 B2                                                 Page 1 of 1
APPLICATION NO.    : 12/497522
DATED              : July 17, 2012
INVENTOR(S)        : Kenneth Greenebaum It is certified that error appears in the above-identified patent and that said Letters Patent is hereby corrected as shown below:

In the Claims

Column 12, Claim 7, line 2: delete "area" and insert --memory--

Column 12, Claim 7, line 3: delete "area" and insert --memory--

Column 12, Claim 8, line 2: delete "area" and insert --memory--

Column 12, Claim 9, line 2: delete "area" and insert --memory--

Column 13, Claim 15, line 2: delete "an" and insert --the--

Column 13, Claim 16, line 1-2: delete "access rights relinquished" and insert --relinquished access rights--

Signed and Sealed this
Tenth Day of June, 2014

Michelle K. Lee
*Deputy Director of the United States Patent and Trademark Office*

UNITED STATES PATENT AND TRADEMARK OFFICE
CERTIFICATE OF CORRECTION

PATENT NO.         : 8,225,061 B2
APPLICATION NO.    : 12/497522
DATED              : July 17, 2012
INVENTOR(S)        : Kenneth Greenebaum It is certified that error appears in the above-identified patent and that said Letters Patent is hereby corrected as shown below:

In the Claims

Column 12, Claim 7, line 28: delete "area" and insert --memory--

Column 12, Claim 7, line 29: delete "area" and insert --memory--

Column 12, Claim 8, line 31: delete "area" and insert --memory--

Column 12, Claim 9, line 34: delete "area" and insert --memory--

Column 13, Claim 15, line 6: delete "an" and insert --the--

Column 13, Claim 16, lines 8-9: delete "access rights relinquished" and insert --relinquished access rights--

This certificate supersedes the Certificate of Correction issued June 10, 2014.

Signed and Sealed this
Fifteenth Day of July, 2014

Michelle K. Lee
*Deputy Director of the United States Patent and Trademark Office*